(12) United States Patent
Adams et al.

(10) Patent No.: US 8,746,039 B2
(45) Date of Patent: *Jun. 10, 2014

(54) CANTILEVERED PROBES HAVING PIEZOELECTRIC LAYER, TREATED SECTION, AND RESISTIVE HEATER, AND METHOD OF USE FOR CHEMICAL DETECTION

(75) Inventors: Jesse D. Adams, Reno, NV (US);
Benjamin S. Rogers, Reno, NV (US);
Todd A. Sulchek, Oakland, CA (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,939

(22) Filed: Mar. 12, 2012

(65) Prior Publication Data
US 2012/0172256 A1    Jul. 5, 2012

Related U.S. Application Data

(63) Continuation of application No. 11/845,661, filed on Aug. 27, 2007, now Pat. No. 8,136,385, which is a continuation of application No. 11/089,559, filed on Mar. 10, 2004, now Pat. No. 7,260,980.

(60) Provisional application No. 60/453,979, filed on Mar. 11, 2003.

(51) Int. Cl.
*G01N 7/00* (2006.01)

(52) U.S. Cl.
USPC .................................................. 73/31.05

(58) Field of Classification Search
None
See application file for complete search history.

(56) References Cited

U.S. PATENT DOCUMENTS

| 7,260,980 B2 * | 8/2007 | Adams et al. ........... 73/31.05 |
| 8,136,385 B2 * | 3/2012 | Adams et al. ........... 73/31.05 |
| 2012/0115757 A1 * | 5/2012 | Adams ..................... 506/39 |

OTHER PUBLICATIONS

Official Action issued in U.S. Appl. No. 13/350,921, dated Jun. 26, 2012, 16 pages.

* cited by examiner

*Primary Examiner* — Robert R Raevis
(74) *Attorney, Agent, or Firm* — Wood, Herron & Evans, LLP

(57) ABSTRACT

The invention provides a liquid cell for an atomic force microscope. The liquid cell includes a liquid cell housing with an internal cavity to contain a fluid, a plurality of conductive feedthroughs traversing the liquid cell housing between the internal cavity and a dry side of the liquid cell, a cantilevered probe coupled to the liquid cell housing, and a piezoelectric drive element disposed on the cantilevered probe. The cantilevered probe is actuated when a drive voltage is applied to the piezoelectric drive element through at least one of the conductive feedthroughs. A method of imaging an object in a liquid medium and a method of sensing a target species with the liquid cell are also disclosed.

14 Claims, 5 Drawing Sheets

CANTILEVERED PROBES HAVING PIEZOELECTRIC LAYER, TREATED SECTION, AND RESISTIVE HEATER, AND METHOD OF USE FOR CHEMICAL DETECTION

CROSS REFERENCE TO RELATED APPLICATION

This application is a Continuation of U.S. patent application Ser. No. 11/845,661, filed Aug. 27, 2007, and entitled "Cantilevered Probes Having Piezoelectric Layer, Treated Section, And Resistive Heater, And Method Of Use For Chemical Detection", which in turn is a Continuation of U.S. patent application Ser. No. 11/089,559, filed Mar. 10, 2004, now U.S. Pat. No. 7,260,980, which in turn claims the benefit of U.S. Provisional Application No. 60/453,979, filed Mar. 11, 2003. This application is related to U.S. Ser. No. 11/845,680, filed Aug. 27, 2007, U.S. Ser. No. 12/416,852, filed Apr. 1, 2009, and U.S. Ser. No. 12/748,788, filed Mar. 29, 2010.

FIELD OF THE INVENTION

This invention relates generally to atomic force microscopy (AFM) and methods of imaging thereof. In particular, the invention relates to AFM imaging of samples in liquid, and the detection of specific chemical and biological species using vibrating cantilevered probes.

BACKGROUND OF THE INVENTION

Atomic force microscopy, also called scanning force microscopy and scanning probe microscopy, has become an important tool for biological science, with significant application to imaging samples such DNA and living cells in solution. When imaging biological samples, an atomic force microscope (AFM) is usually operated with a liquid cell, because the samples need to remain immersed in order to retain natural characteristics.

Generally atomic force microscopes for biological science employ liquid cell housings that contain a specimen in fluid. A fluid cell for an atomic force microscope is described by Hansma et al. in "Atomic Force Microscope with Optional Replaceable Fluid Cell," U.S. Pat. No. 4,935,634 issued Jun. 19, 1990. The optional and replaceable probe-carrying module includes the provision for forming a fluid cell around the AFM probe.

An electro-chemical liquid cell for use with an atomic force or scanning tunneling microscope is described by Lindsay et al. in "Scanning Probe Microscope for Use in Fluids," U.S. Pat. No. 5,750,989 issued May 12, 1998. A hermetically sealed chamber may be formed around a sample by a seal between the scanner of the microscope and its frame.

Knauss et al. describes a hyperbaric hydrothermal atomic force microscope with a gas pressurized microscope base chamber and a sample cell environment in "Hyperbaric Hydrothermal Atomic Force Microscope," U.S. Pat. No. 6,437,328 issued Aug. 20, 2002. The AFM images solid surfaces in liquid or gas that flow within the sample cell at pressures greater than normal atmospheric pressure.

Tapping mode AFM has become an important tool, capable of nanometer-scale resolution on biological samples. The periodic contact with the sample surface minimizes frictional forces, avoiding significant damage to fragile or loosely attached samples. A representative tapping AFM is described by Elings et al. in "Tapping Atomic Force Microscope," U.S. Pat. No. 5,412,980 issued May 9, 1995.

Liquid tapping-mode AFM, also referred to as liquid cyclic-mode AFM, is a scanning probe imaging mode that is suitable for biological imaging and is used frequently to obtain nanometer-scale resolution on fragile specimens. Liquid tapping-mode AFM helps to minimize friction damage that is characteristic of contact-mode AFM, to reduce van der Waals forces, and to eliminate capillary forces between an AFM cantilever tip and a specimen. Tapping mode has been used to image DNA in situ, the folding and unfolding of individual titin molecules, crystal growth, Langmuir-Blodgett films, polymers, living plant cells, red and white blood cells, moving myosin V molecules, and numerous other biological samples.

AFMs in a liquid tapping mode typically employ a cantilever, an external piezoelectric oscillator, and an optical displacement-sensing component. An AFM operating in a vibrating, cyclic or tapping mode may use a piezoelectrically actuated microcantilevered probe. Typically, the probe is a micro-electrical-mechanical-system (MEMS) device, micromachined from bulk silicon and silicon-on-insulator (SOI) wafers with a piezoelectric film patterned along a portion of the microcantilever. At the free end of the cantilever is a tip with nanometer-scale radius, optimally shaped to probe the sample surface. The microcantilever is displaced by voltage applied to the piezoelectric actuator, resulting in a controlled vertical movement of the tip. Control electronics drive the microcantilever while simultaneously positioning it vertically to track the sample topography and follow the surface features. A macro-scale position actuator such as a piezotube may be used to null the position of the cantilever, following the topology of the sample as the probe is scanned over the surface. Smaller AFM cantilevers have been developed, contributing to improvements in the imaging speed of the liquid tapping mode.

Xu et al. describes an AFM with a cantilever tip for probing a biological specimen in "Atomic Force Microscope for Biological Specimens, U.S. Pat. No. 5,874,668 issued Feb. 23, 1999. The cantilever is designed to identify physiologically and pharmacologically important biomolecules and their constituent subunits. For example, a cantilever can be manufactured to be biospecific, allowing the identification of specific voltage-sensitive tissues and biomolecules.

A sensor using a cantilever to detect a selected target species is disclosed by Lee et al. in "Chemical and Biological Sensor Using an Ultra-Sensitive Force Transducer," U.S. Pat. No. 5,807,758 issued Sep. 15, 1998. This chemical and biological sensor has a cantilever with attached chemical modifiers capable of undergoing a selective binding interaction. A target specimen in contact with the cantilever can generate an electric or magnetic field that induces a measurable deflection. The target molecule may be in liquid phase or in vapor phase.

Another chemical sensor using microcantilevers is described by Thundat in "Microcantilever Detector for Explosives," U.S. Pat. No. 5,918,263 issued Jun. 29, 1999. This apparatus detects explosive vapor phase chemical, employing a cantilever and a heater for increasing the surface temperature of the cantilever that causes combustion of the adsorbed explosive vapor phase chemical. The combustion results in a deflection and a resonance response of the cantilever.

A magnetically modulated cantilever is described by Han et al. in "Magnetically-Oscillated Probe Microscope for Operation in Liquids," U.S. Pat. No. 5,753,814 issued May 19, 1998. The invention employs an AC-driven atomic force microscope with a ferrite-core solenoid for modulating the magnetic cantilever. The detection system for the magnetically modulated AC-AFM incorporates AC coupling of the signal from the position sensitive detector/beam deflection detector in order to remove the DC component of the signal. The result is an improved dynamic range over systems using DC coupling.

Attempts have been made to increase the speed of AFM imaging. An amplitude detection circuit is used to dynamically control the cantilever drive signal in an amplitude domain, as described by Adderton et al. in "Dynamic Activation for an Atomic Force Microscope and Method of Use Thereof," U.S. Patent Application 2002/0062684, published May 30, 2002.

Lee et al. have used piezoelectric lead-zirconate-titanate (PZT) actuated cantilevers to achieve 1,030 pixels/s and tip speeds of 16 .mu.m/s, as disclosed in J. Vac. Sci. & Tech., B 15(4), 1559 (1997). Cantilever probes with a thin integrated film of zinc oxide (ZnO) serving as an actuator have achieved a resonance frequency on the order of 15 kHz in liquid. The results are faster imaging speeds and improved tuning capability, as reported by Sulchek et al. in Rev. Sci. Instrum. 71(5), 2097 (2000), and by Rogers et al. in Rev. Sci. Instrum. 73(9), 3242 (2002). For most biological samples, conventional AFMs can scan at speeds of a few tens of microns per second, which could require several minutes to produce a 512.times.512 pixel image. Thus, the scan rate of an AFM may be too slow for applications where biological and chemical processes occur in less than a minute.

Faster measurement times would help shrink the existing separation between the time scales of force spectroscopy experiments and the time scales of molecular dynamics calculations. Quicker scan speeds would reduce the time spent locating interesting features and would enable the study of dynamics occurring in liquid or physiological environments. An improved method for scanning a specimen that is in a liquid environment would scan more quickly and provide better tuning capability than currently used AFM cantilever probes. In addition, an improved method would provide a real-time imaging tool for studying dynamic phenomena in physiological conditions.

Therefore, what is needed is a structure and a method for quicker imaging times for contact and tapping mode atomic force microscopy in liquid, and for sensing target chemical and biological species in liquid, overcoming the deficiencies and obstacles described above.

SUMMARY OF THE INVENTION

One aspect of the invention provides a liquid cell for an atomic force microscope. The liquid cell includes a liquid cell housing with an internal cavity to contain a fluid, a plurality of conductive feedthroughs traversing the liquid cell housing between the internal cavity and a dry side of the liquid cell, and a cantilevered probe, which is coupled to the liquid cell housing with at least a portion of the cantilevered probe located inside the internal cavity. The liquid cell includes a piezoelectric drive element disposed on the cantilevered probe. The cantilevered probe is actuated when a drive voltage is applied to the piezoelectric drive element through at least one of the conductive feedthroughs.

The liquid cell may include an optical window in the liquid cell housing, so that a beam of light may traverse the optical window to optically monitor the cantilevered probe. The liquid cell may include an inlet port connected between the internal cavity and the dry side of the liquid cell, so that fluid may be injected into the internal cavity of the liquid cell housing. A passivation layer may be disposed onto the piezoelectric drive element to electrically isolate the piezoelectric drive element when a conductive fluid is placed in the internal cavity of the liquid cell housing. An atomic probe tip may be coupled to a free end of the cantilevered probe. A treated section may be coupled to the cantilevered probe. The treated section causes a deflection of the cantilevered probe or a shift in a resonant frequency of the cantilevered probe when exposed to a target species. A piezoresistive sense element may be coupled to the cantilevered probe to sense bending of the cantilevered probe. The liquid cell may include a probe heater coupled to the cantilevered probe that is heated when a heater voltage is applied to at least one conductive feedthrough that is electrically connected to the probe heater.

Another aspect of the invention provides a method of imaging an object in a liquid medium. A liquid cell is positioned adjacent to the object, the liquid cell including a liquid cell housing with an internal cavity and a plurality of conductive feedthroughs connected between the internal cavity and a dry side of the liquid cell. The position of an atomic probe tip, which is coupled to a free end of a cantilevered probe, is measured when the atomic probe tip contacts the object, the cantilevered probe being coupled to the liquid cell housing and a portion of the cantilevered probe being located inside the internal cavity. An image of the object is generated based on the measured position of the atomic probe tip when the atomic probe tip is scanned across the object.

An excitation voltage may be applied through at least one conductive feedthrough to a piezoelectric drive element disposed on the cantilevered probe, the excitation voltage being applied at a frequency near a resonant frequency of the cantilevered probe to tap the atomic probe tip against the object. A fluid may be injected onto the object through an inlet port, which is connected between the internal cavity and the dry side of the liquid cell.

Another aspect of the invention provides a method of sensing a target species with a liquid cell. A cantilevered probe is driven with an excitation voltage. A first deflection amplitude of the cantilevered probe is measured with a sense element coupled to the cantilevered probe. A treated section of the cantilevered probe is exposed to a target species. A second deflection amplitude of the cantilevered probe is measured, and the target species is determined based on the first deflection amplitude measurement and the second deflection amplitude measurement. A first frequency of the cantilevered probe may be measured with the sense element coupled to the cantilevered probe. The treated section of the cantilevered probe is exposed to the target species. A second frequency of the cantilevered probe is measured, and the target species is determined based on the first frequency measurement and the second frequency measurement.

A fluid including the target species may be injected into the interior cavity of the liquid cell through an inlet port, which is connected between the internal cavity and the dry side of the liquid cell. An atomic probe tip coupled to a free end of the cantilevered probe may be tapped against a mechanical stop, which may be coupled to a base end of the cantilevered probe.

The current invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The forgoing aspects and other attendant advantages of the present invention will become more readily appreciated by the detailed description taken in conjunction with the accompanying drawings.

BRIEF DESCRIPTION OF THE DRAWINGS

Various embodiments of the present invention are illustrated by the accompanying figures, wherein.

DETAILED DESCRIPTION OF THE INVENTION

Figure 1:
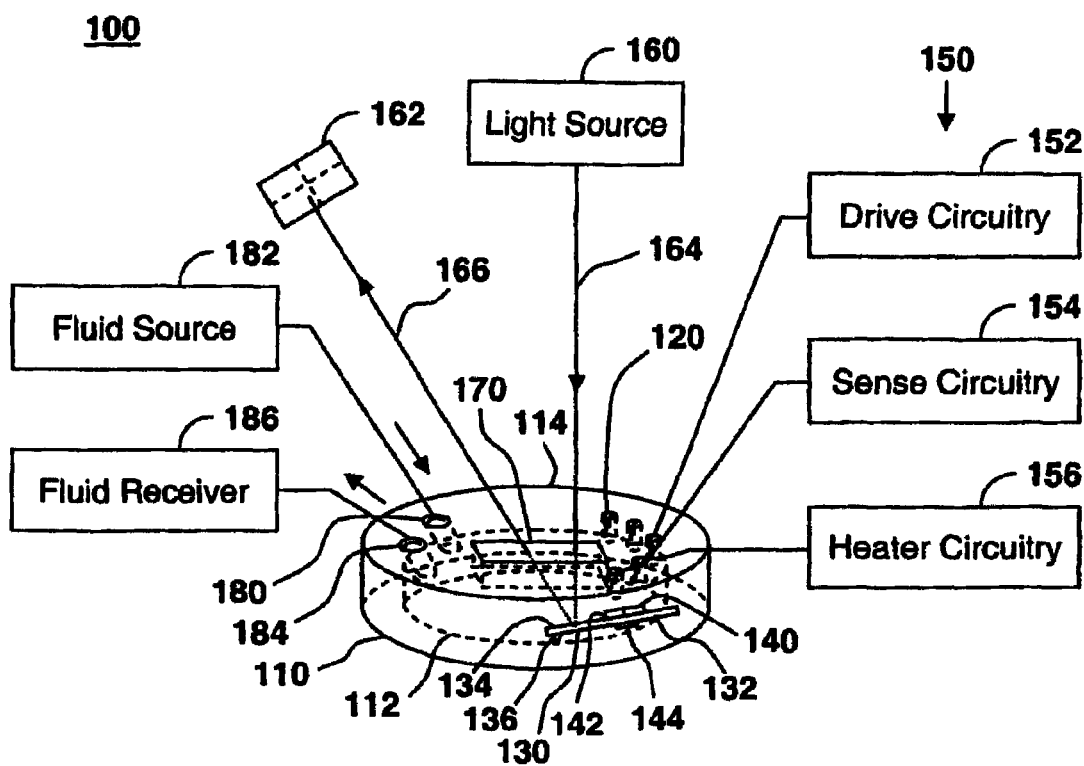
FIG. 1 illustrates a liquid cell for an atomic force microscope, in accordance with one embodiment of the current invention.

FIG. 1 illustrates a liquid cell for an atomic force microscope, in accordance with one embodiment of the current invention at 100. Liquid cell 100 includes a liquid cell housing 110, one or more conductive feedthroughs 120, a cantilevered probe 130 coupled to liquid cell housing 110, and a drive element 140 disposed on cantilevered probe 130. At least a portion of cantilevered probe 130 is located inside an internal cavity 112. Liquid cell 100 may be used to image an object or a surface, or to sense a target chemical or biological species. Liquid cell 100 may be used, for example, in a handheld system for sensing a target chemical or biological species, or in an atomic force microscope (AFM) for imaging objects and surfaces. Liquid cell 100 may hold one or more cantilevered probes 130, for example, arranged in an array for high throughput imaging, or in an array with individually treated probes for detecting one or more target species. Multiple cantilevered probes 130 may be configured to provide additional sensitivity or selectivity to multiple chemical species within the same liquid cell 100, or to cancel out common-mode effects.

Drive element 140 on cantilevered probe 130 may be operated at a voltage below the electrolysis limit of a fluid encompassing drive element 140 to allow operation in the fluid without a protective passivation layer. Alternatively, cantilevered probe 130 may be operated at a higher voltage with a protective coating covering at least drive element 140.

Cantilevered probe 130 may be driven into oscillation with a periodic voltage, may be deflected with a constant or non-periodic voltage, or may be driven into oscillation with a period voltage while being deflected with a constant or non-periodic voltage by drive element 140. Forced oscillations of cantilevered probe 130 are useful for tapping mode atomic force microscope imaging and frequency-shift chemical sensing. Deflections of cantilevered probe 130 with application of constant or non-periodic voltage are useful for maintaining a constant force at high speeds in various modes of atomic force microscope imaging and for taking force-distance measurements.

Liquid cell housing 110 may be formed from plastic, metal, or any suitable material for housing cantilevered probe 130 and conductive feedthroughs 120. For example, the liquid cell housing may comprise a material such as an acrylic, polymethyl methacrylate (PMMA), glass, quartz, a thermoplastic polymer, a thermoset polymer, an insulating material, or a transparent material. Liquid cell housing 110 includes internal cavity 112 that may contain, for example, a non-conductive fluid such as a isopropyl alcohol or a conductive fluid such as saline solution. Other fluids that may be contained in internal cavity 112 include gases such as air. Internal cavity 112 is generally opened on the bottom to allow a sample to be measured while it is in a fluid, the fluid being partially trapped inside internal cavity 112 by meniscus forces, or the fluid being injected into internal cavity 112 through an inlet port 180. Inlet port 180 is connected between internal cavity 112 and dry side 114 of liquid cell 100. Internal cavity 112 may be closed on the bottom to entrap a sample gas or liquid within internal cavity 112 during chemical detection and analysis.

The gas or liquid may be injected from a fluid source 182. The effluent may be exhausted through an outlet port 184 to a fluid receiver 186, vented to the atmosphere, or otherwise contained, discarded or recirculated. A target chemical or biological species, typically carried in the air, in a liquid, or in a controlled gas environment, enters interior cavity 112 of liquid cell 100 through inlet port 180 and may exit through outlet port 184. Pumps, valves, or other fluidic control devices may be included to aid in the transport of chemical or biological fluids to and from interior cavity 112 of liquid cell 100, and seals around inlet port 180 and outlet port 184 may be used to minimize leakage.

Liquid cell 100 may also contain suitable connectors, photodetectors and other elements for controlling and monitoring cantilevered probe 130. Liquid cell 100 may include filters, scrubbers, and other media treatment elements to aid in the imaging of objects and surfaces, and in the detection of target chemical and biological species.

Conductive feedthroughs 120 traverse liquid cell housing 110 between internal cavity 112 and a dry side 114 of liquid cell 100, and provide electrical connectivity between outside connections to printed circuit boards, sockets, AFM heads, and other electronic circuitry and internal connections to cantilevered probe 130 and other electronic devices contained in liquid cell 100. Conductive feedthroughs 120 may comprise, for example, pins, posts, wires, connectors, plated feedthroughs, insulated metal pins, or any suitable feedthrough mechanism available in the art, and may be arranged to readily accommodate the external connections. In addition to electrical connectivity, conductive feedthroughs 120 may provide mechanical connectivity between liquid cell 100 and an externally coupled device. Conductive feedthroughs 120 and connecting wires may be passivated on the liquid side of liquid cell 100, and electrical signals may run through liquid cell housing 110 to dry side 114 and control circuitry 150. Conductive feedthroughs 120 and connecting wires or conductors may be passivated, for example, with a silicone rubber, a silicone gel, an epoxy, or a suitable insulating coating.

Cantilevered probe 130 is typically a relatively thin beam clipped, screwed, or otherwise mounted securely to liquid cell housing 110 at a base end 132 of cantilevered probe 130. A free end 134 of cantilevered probe 130 is generally free to vibrate and bend when driven, for example, by drive element 140, by continuous or intermittent contact with a surface or object to be imaged, or when exposed to a target chemical or biological species. An atomic probe tip 136 may be coupled to free end 134 of cantilevered probe 130.

Cantilevered probe 130 may comprise a layer of silicon, polysilicon, silicon nitride, a metal film, a metal sheet, a zinc oxide (ZnO) film, a lead-zirconate-titanate (PZT) film, silicon dioxide, a polymeric layer, or combinations thereof. Cantilevered probe 130 may comprise a piezoelectric drive element 140, which may be actuated when a drive voltage is applied to piezoelectric drive element 140 through at least one of the conductive feedthroughs 120. For example, cantilevered probe 130 may comprise a layer of silicon with a thin layer of zinc oxide or PZT disposed on one side of the silicon layer. Zinc oxide may be deposited on cantilevered probe 130 using, for example, a sputtering process. PZT may be deposited on cantilevered probe 130 using, for example, a sol-gel process. In another example, cantilevered probe 130 comprises a layer of silicon nitride with a patterned piezoelectric film on one side of the silicon nitride layer. Two thin layers of a metal such as gold or platinum are positioned on each side of the patterned piezoelectric film, providing electrical contact to the piezoelectric film. In another example, cantilevered probe 130 comprises a layer of single-crystal silicon, a piezoresistive layer such as deposited polycrystalline silicon, and a dielectric layer such as silicon dioxide positioned between the single-crystal silicon layer and the piezoresistive layer. In another example, a piezoresistor is formed in or near a surface of a single-crystal silicon cantilever. In another example, cantilevered probe 130 comprises a thin piece of metal such as steel upon which a piezoelectric film is deposited. In another example, cantilevered probe 130 comprises a polymeric layer such as polymethylmethacrylate (PMMA), polyimide, or a plastic.

Atomic probe tip 136 may be coupled to free end 134 of cantilevered probe 130 to scan a sample surface or object being imaged, or to tap against the sample surface or object when cantilevered probe 130 is oscillated. Atomic probe tip 136 may be integrally formed with cantilever probe 130. For example, atomic probe tip 136 and cantilevered probe 130 can be formed from thin films such as a silicon nitride film that are deposited conformally onto a silicon wafer surface and into an etch pit formed in the silicon wafer surface, such that the silicon nitride film is subsequently patterned and etched to form cantilevered probe 130 with atomic probe tip 136. In another example, atomic probe tip 136 may be formed from silicon or silicon dioxide by selective patterning and etch back steps, as is known in the art. In another example, a monolithic atomic probe tip 136 is attached to cantilevered probe 130 using micromanipulators and standard adhesives. Atomic probe tip 136 may be formed from tungsten, carbon nanotubes, diamond, or any relatively hard material that can be formed into a tip or a small-diameter cylinder, and formed on or attached to cantilevered probe 130. Atomic probe tip 136 provides a small, pointed, contact surface for tapping against an object, surface, or a mechanical stop when cantilevered probe 130 is oscillated. A small contact surface is generally desired for higher spatial resolution and for minimizing stiction or other forces that may cause atomic probe tip 136 to inadvertently stick when oscillated.

Cantilevered probe 130 may be driven into oscillation with drive element 140 so that oscillating cantilevered probe 130 is tapped against an object, surface, or mechanical stop. Amplitudes of oscillation and changes in the oscillation amplitude are measured while an object or surface is scanned, or after cantilevered probe 130 is exposed to a chemical or biological species. A target chemical or biological species may be determined based on oscillation amplitudes of cantilevered probe 130 that are measured by sense element 142 when a treated section 144 coupled to cantilevered probe 130 is exposed to a target chemical or biological species. Treated section 144 may cause a deflection of cantilevered probe 130 or a shift in a resonant frequency of cantilevered probe 130 when exposed to a target species.

Cantilevered probe 130 includes a treated section 144. Treated section 144 may comprise, for example, a selective coating or a patterned film on cantilevered probe 130. Cantilevered probe 130 may comprise, for example, a bimorph cantilevered probe where one layer of the bimorph comprises a silicon layer and a second layer comprises a chemically sensitive material.

Treated section 144 responds when exposed to a target chemical or biological species. Treated section 144 may respond by absorbing, adsorbing, or otherwise reacting to a target chemical or biological species. When exposed to a target chemical or biological species, treated section 144 may increase or decrease in mass, or become more rigid or less rigid. In one example, treated section 144 comprises a patterned layer of gold. When exposed to mercury, the two elements react to form an amalgam. The gold-mercury amalgam adds mass to cantilevered probe 130 and therefore tends to decrease the resonant frequency of cantilevered probe 130. Amalgam formation, however, increases the mechanical stiffness of cantilevered probe 130, thereby increasing its natural resonant frequency. The two effects tend to cancel each other, though one effect can be made dominant by careful selection and placement of treated section 144 on cantilevered probe 130. Since the layers comprising cantilevered probe 130 are typically thin, any response by treated section 144 to a target chemical or biological species will tend to bend and curl cantilevered probe 130 either up or down. Minimal displacement of free end 134 of cantilevered probe 130 due to bending occurs when a small section close to free end 134 is treated. Increased displacement of free end 134 of cantilevered probe 130 occurs when treated section 144 is located near base end 132. Maximum displacement of free end 134 of cantilevered probe 130 occurs when treated section 144 comprises an entire side of cantilevered probe 130, such as when one side of cantilevered probe 130 is coated with a thin film of gold. Because treating the cantilevered probe symmetrically on both sides tends to negate the bending effects, a treatment of cantilevered probe 130 is generally applied to one side or the other.

Vibrations or oscillations of cantilevered probe 130 generally occur symmetrically above and below the static displacement profile or neutral position of cantilevered probe 130, whether cantilevered probe 130 is bent upwards, downwards, or is straight. Bending effects with exposure to a target chemical or biological species are likely to occur much more slowly than individual oscillations of cantilevered probe 130, and are referred to as quasi-static bending.

Treated section 144 of cantilevered probe 130 may comprise a coating such as, for example, a gold layer, a palladium layer, an alcohol-absorbent polymer, a water-absorbent material, a chemical-sensitive layer, a biosensitive material, or a thiol. Treated section 144 of cantilevered probe 130 may be selected such that the oscillating cantilevered probe can detect and is sensitive to mercury, hydrogen, an alcohol, water vapor, a chemical element, a chemical compound, an organic material, an inorganic material, a biological material, a DNA strand, a bioactive agent, a toxin, or any such chemical or biological material that can be detected with a treated cantilevered probe.

Treated section 144 of cantilevered probe 130 may comprise, for example, a thin film covering one side of cantilevered probe 130, such as the top or bottom of cantilevered probe 130, or a section of either side. In one embodiment, treated section 144 of cantilevered probe 130 comprises a patterned thin film located near base end 132 of cantilevered probe 130. Treated section 144 of cantilevered probe 130 may be selectively patterned and etched to achieve large displacements with chemical or biological exposure, yet still may allow room for other probe elements such as drive element 140 and sense element 142 to be placed on cantilevered probe 130.

Drive element 140 may comprise any suitable actuation mechanism such as, for example, a piezoelectric drive element, an electrostatic drive element, a thermal drive element, a magnetic drive element, or other suitable drive mechanism as is known in the art. Drive element 140 coupled to cantilevered probe 130 may comprise, for example, a piezoelectric film disposed near base end 132 of cantilevered probe 130. When drive voltages are applied to the piezoelectric film, cantilevered probe 130 bends according to the level of the voltage, and the forces and moments generated by the piezoelectric film. When an oscillating voltage is applied to the piezoelectric film, cantilevered probe 130 may be driven at or near a natural resonant frequency and may achieve a much larger amplitude than a statically driven probe. The achieved deflection amplitude may depend, for example, on the frequency and mode of oscillation, the internal damping of the probe and applied films, and viscous damping due to gas or liquids surrounding the probe. Drive element 140 and sense element 142 may comprise, for example, a unitary piezoelectric element coupled to the cantilevered probe.

Sense element 142 generates a signal based on the static and dynamic deflections of cantilevered probe 130. The generated signals may be used to determine static deflections, quasi-static deflections, oscillation amplitudes and frequencies of cantilevered probe 130. A piezoelectric film such as a zinc oxide film or a PZT layer may be used to generate a signal when cantilevered probe 130 is displaced or vibrated. The same piezoelectric film may be used to drive cantilevered probe 130 into oscillation, as well as to sense the displacements, sometimes referred to as self-sensing.

Sense element 142 may comprise, for example, a piezoelectric sense element, an optical sense element, a piezoresistive sense element, an electrostatic or capacitive sense element, a magnetic sense element, or any suitable sense element as is known in the art. Sense element 142 may comprise, for example, a light source 160 for directing an incident beam of light 164 through an optical window 170 in liquid cell housing 110 onto cantilevered probe 130, and a photodetector 162 for detecting a reflected beam of light 166 reflected from cantilevered probe 130 and traversing optical window 170, whereby frequencies and amplitudes of oscillations can be measured with photodetector 162 and cantilevered probe 130 can be optically monitored. Optical window 170 may also be used to view an object or surface when imaging. The angle of optical window 170 may be selected to compensate for the refraction of beam of light 164 from a laser as beam of light 164 enters and leaves a liquid medium within liquid cell 100 so that alignment with photodetector 162 is maintained.

Light source 160 and associated optics such as mirrors and lenses direct incident beam of light 164 onto a surface of cantilevered probe 130. Light source 160, for example, may comprise a laser or a laser diode and collimating lenses for generating a well-defined light beam. Incident beam of light 164, for example, may comprise coherent laser light at a predefined wavelength that is focused and positioned near the free end of cantilevered probe 130. Photodetector 162 may comprise, for example, a position-sensitive detector (PSD), a photodiode, a photodiode array, or a photodetector array. Photodetector 162 may include a filter, for example, that filters out stray light and transmits light from reflected beam of light 166. Photodetector 162 detects reflected beam of light 166 and provides a measure of the oscillation amplitude of cantilevered probe 130 by detecting changes in position and in light intensity of the reflected light. Other optical sense elements may be employed, such as diffraction gratings attached to free end 134, or interferometric techniques between a surface of cantilevered probe 130 and a reference optical surface.

Cantilevered probe control circuitry 150 comprises circuits and electronic devices to drive cantilevered probe 130 into oscillation and to measure deflection amplitudes of the oscillating cantilevered probe 130. Control and monitoring of the cantilevered probe and positioning elements may be done with control circuitry 150. Control circuitry 150 may include, for example, drive circuitry 152 and sense circuitry 154. Drive circuitry 152 and sense circuitry 154 cooperate to drive cantilevered probe 130 into oscillation using any suitable drive element 140 such as a piezoelectric drive element, an electrostatic drive element, a thermal drive element, or a magnetic drive element. Drive circuitry 152 and sense circuitry 154 cooperate to measure deflection amplitudes of oscillating cantilevered probe 130 with any suitable sense element 142 such as an optical sense element, a piezoelectric sense element, a piezoresistive sense element, a capacitive sense element, or a magnetic sense element.

Control circuitry 150 may include, for example, drive circuitry 152 and sense circuitry 154 that contain suitable electronic circuits to drive cantilevered probe 130 into oscillation with a drive element 140 mounted on cantilevered probe 130, and to measure a signal from a separate piezoelectric sense element 142 when cantilevered probe 130 is oscillating.

In another example, control circuitry 150 includes drive circuitry 152 and sense circuitry 154 that drive cantilevered probe 130 into oscillation with a piezoelectric drive element 140 mounted on cantilevered probe 130, along with electronic circuits for directing incident beam of light 164 onto a surface of oscillating cantilevered probe 130 and to detect reflected beam of light 166 when the beam of light is reflected from the surface of the oscillating cantilevered probe 130.

In another example, control circuitry 150 includes drive circuitry 152 and sense circuitry 154 that drive cantilevered probe 130 into oscillation with a unitary piezoelectric element mounted on cantilevered probe 130, and that sense oscillation amplitudes of cantilevered probe 130 with the same unitary piezoelectric element.

In another example, control circuitry 150 includes drive circuitry 152 and sense circuitry 154 that drive cantilevered probe 130 into oscillation with thermal drive element coupled to cantilevered probe 130 and that sense oscillation amplitudes of cantilevered probe 130 with a piezoresistor formed in cantilevered probe 130.

In another example, control circuitry 150 includes heater circuitry 156 that controls power to a probe heater coupled to cantilevered probe 130. A heater voltage may be applied to the probe heater through one or more conductive feedthroughs 120.

Control circuitry 150 may also include positioning circuitry to adjust the position of a reference surface, also referred to as a mechanical stop, when engaging the cantilevered probe and when operating oscillating cantilevered probe 130 in an open-loop or closed-loop mode. Control circuitry 150 may have an interface to a control computer.

A control computer may be interfaced with control circuitry 150 to control the operations and functions of liquid cell 100. The control computer may include or have access to one or more databases for collecting, analyzing, and storing data from liquid cell 100. The control computer may contain suitable hardware and software for imaging an object or a sample surface, or for determining a target chemical or biological species based on oscillation amplitudes or measured frequencies of cantilevered probe 130. The control computer may be networked.

Although liquid cell 100 is depicted as an imaging head for an AFM, the present invention does not require the AFM to drive and sense cantilevered probe 130, particularly when used for chemical and biological sensing applications. With portable devices, the scanning and sample placement systems can be omitted. In one embodiment, liquid cell 100 may be used in a dual mode as part of an AFM and as a chemical or biological sensor.

Figure 2:
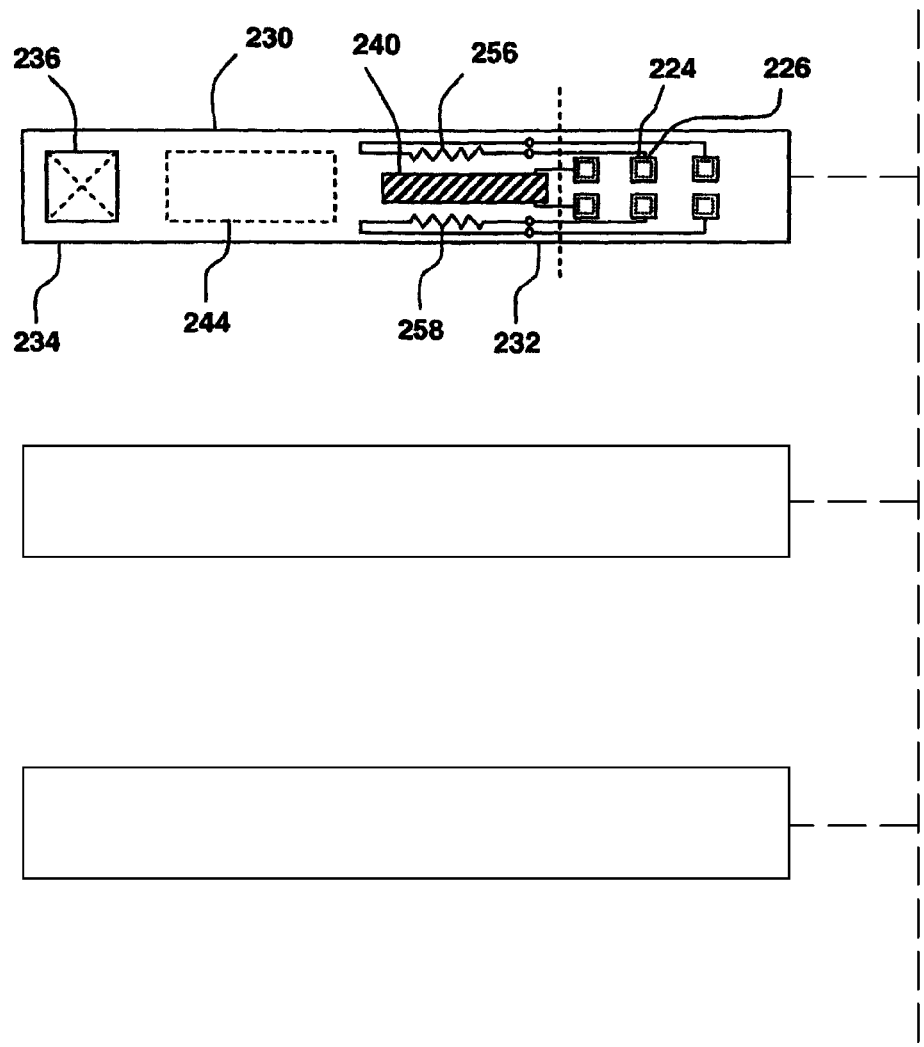
FIG. 2 illustrates a top view of a cantilevered probe array, in accordance with one embodiment of the current invention.

FIG. 2 illustrates a top view of a cantilevered probe, in accordance with one embodiment of the present invention at 200. A cantilevered probe 230 includes a drive element 240 located near a base end 232 of cantilevered probe 230. Cantilevered probe 230 is generally attached to a liquid cell housing near base end 232 of cantilevered probe 230. A free end 234 of cantilevered probe 230 may vibrate and move freely in response, for example, to excitation by drive element 240, when scanned across an object or a surface, or when exposed to a target species. Drive element 240 may comprise, for example, a piezoelectric drive element, an electrostatic drive element, a thermal drive element, or a magnetic drive element.

Cantilevered probe 230 may include an atomic probe tip 236 coupled to free end 234 of cantilevered probe 230. A treated section 244 may be coupled to cantilevered probe 230 to cause, for example, a deflection of cantilevered probe 230 or a shift in a resonant frequency of cantilevered probe 230 when treated section 244 is exposed to a target species. A piezoresistive sense element 256 or other suitable sense element such as a piezoelectric sense element or a magnetic sense element may be coupled to cantilevered probe 230 to sense bending of cantilevered probe 230. A magnetic sense element, such as one or more loops of wire, may be electrically connected to external sense circuitry through one or more conductive feedthroughs in the liquid cell. A probe heater 258 may be coupled to cantilevered probe 230 to heat cantilevered probe 230 when a heater voltage is applied to probe heater 258. Probe heater 258 may comprise, for example, a resistive heater formed in or on cantilevered probe 230. Probe heater 258 may be used to heat the cantilevered probe to an elevated temperature for initializing or re-initializing treated section 244. Probe heater 258 may be used, for example, to initiate or cause a chemical reaction on cantilevered probe 230.

Cantilevered probe 230 may have a rectangular shape, though other shapes may be suitably used such as a pointed cantilever, a V-shaped cantilever, a triangular-shaped cantilever, or a dual-arm cantilever. Cantilevered probe 230 may be arranged in an array of cantilevered probes, the cantilevers being all identical, all different, or some combination thereof. An array of cantilevered probes 230 may be attached to a common base. The array of cantilevered probes 230 may be driven and sensed, for example, with a unitary piezoelectric element coupled to each cantilevered probe. In one embodiment, the unitary piezoelectric elements in the array may be connected in series. The series-connected piezoelectric elements in the array may be driven with as few as two electrical connections to the piezoelectric element array. In this case, scanning the drive voltage through a range of frequency can excite and sense one probe at a time, allowing interrogation of any probe in the array while minimizing the number of electrical connections required. In another configuration, the piezoelectric elements in the array are connected in parallel, such that as few as two electrical connections may be used to drive and sense the probes and that failure of one probe does not prevent others from operating. In another configuration, the array of piezoelectric elements is connected in a series-parallel arrangement.

In an alternative embodiment, cantilevered probe 230 is attached at each end, with the center of cantilevered probe 230 free to vibrate. Atomic probe tip 236 may be attached at or near the center of the probe. In another embodiment, cantilevered probe 230 is attached on all sides in a diaphragm or membrane configuration, with atomic probe tip 236 located at or near the center of the diaphragm. In another embodiment, cantilevered probe 230 in a cantilevered, doubly supported or diaphragm configuration has two or more atomic probe tips 236. Multiple probe tips may be used, for example, to preferentially excite specific resonant modes or to provide additional information for detection of chemical or biological materials.

Electrical connections to drive element 240, piezoresistive sense element 256, probe heater 258, and other drive or sense elements included on cantilevered probe 230 may be connected to conductive feedthroughs in the liquid cell through wire bonds or other wiring connected between the conductive feedthroughs and bond pads 224 on cantilevered probe 230. A passivation layer disposed on drive element 240 may have openings 226 to allow electrical connections to bond pads 224. Openings 226 may have been formed, for example, by patterning and wet or dry etching during fabrication of cantilevered probe 230.

Figure 3:
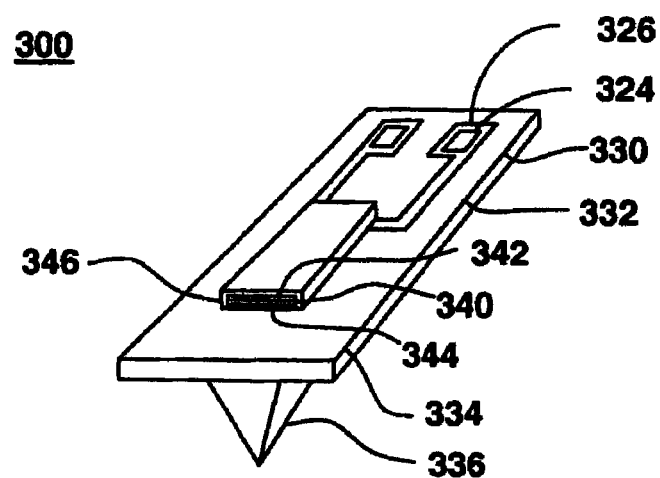
FIG. 3 illustrates a perspective view of a cantilevered probe, in accordance with another embodiment of the current invention.

FIG. 3 illustrates a perspective view of a cantilevered probe, in accordance with another embodiment of the present invention at 300. A cantilevered probe 330 contains a piezoelectric drive element 340. Piezoelectric drive element 340 is typically located on a surface near a base end 332 of cantilevered probe 330. Piezoelectric drive element 340 may comprise a piezoelectric material such as zinc oxide, lead zirconate titanate, polyvinylidene fluoride, or a piezoelectric film. An upper electrode 342 and a lower electrode 344 generally sandwich the piezoelectric material, such that excitation voltages applied to the electrodes generate an expansion or contraction of cantilevered probe 330 to induce bending. Alternately, the piezoelectric material may be used as a sense element, detecting bending, vibrations and displacements of a free end 334 of cantilevered probe 330. An atomic probe tip 336 may be coupled near free end 334 of cantilevered probe 330 to aid in the imaging process.

A passivation layer 346 may be disposed onto piezoelectric drive element 340 to electrically isolate piezoelectric drive element 340 when, for example, a conductive fluid is placed in the internal cavity of a liquid cell housing including cantilevered probe 330. Passivation layer 346 covers upper electrode 342 and any exposed surfaces of lower electrode 344 such as the sidewalls. Passivation layer 346 prevents shorting, arcing, or any parasitic leakage paths between upper electrode 342 and lower electrode 344 that would degrade the performance of piezoelectric drive element 340. To minimize or reduce shorting or arcing between electrodes 342 and 344, either upper electrode 342, lower electrode 344 or both may be smaller than piezoelectric drive element 340 to reduce the possibility that a portion of either electrode 342 and 344 could touch the other. Lower electrode 344 may be smaller than piezoelectric drive element 340 to prevent direct exposure to a conducting liquid in the fluid cell.

Passivation layer 346 may serve to coat and protect piezoelectric drive element 340 from conductive liquids and permeation of the piezoelectric material, and to eliminate parallel conducting paths between the electrodes. Passivation layer 346 may comprise, for example, silicon nitride, silicon dioxide, parylene, Teflon, an insulating polymer, or an insulating material. Upper electrode 342 and lower electrode 344 are typically routed via metal traces to bond pads 324 on cantilevered probe 330. Bond pad openings 326 may be formed in passivation layer 346 to expose bond pads 324 for external electrical connection, for example, with wire bonds or other wiring technique. Passivation layer 346 may be deposited, for example, simultaneously on multitude cantilevered probes at the wafer level, at the die level, on individual cantilevered probes, or after mounting cantilevered probe 330 into the liquid cell. Passivation coatings using conformal coatings such as parylene C may be applied. Plasma cleaning and other cleaning techniques may be used to improve adhesion and reduce pinholes and other defects. Masking and etching steps for piezoelectric drive element 340 may be utilized to minimize or eliminate overhanging metal layers that are difficult to passivate.

The wiring between cantilevered probe 330 and conductive feedthroughs in the liquid cell are generally passivated, using commercially available coatings and coating techniques such as RTV, silicone rubber, silicone gel, an epoxy, an insulating polymer or an insulating material.

Figure 4:
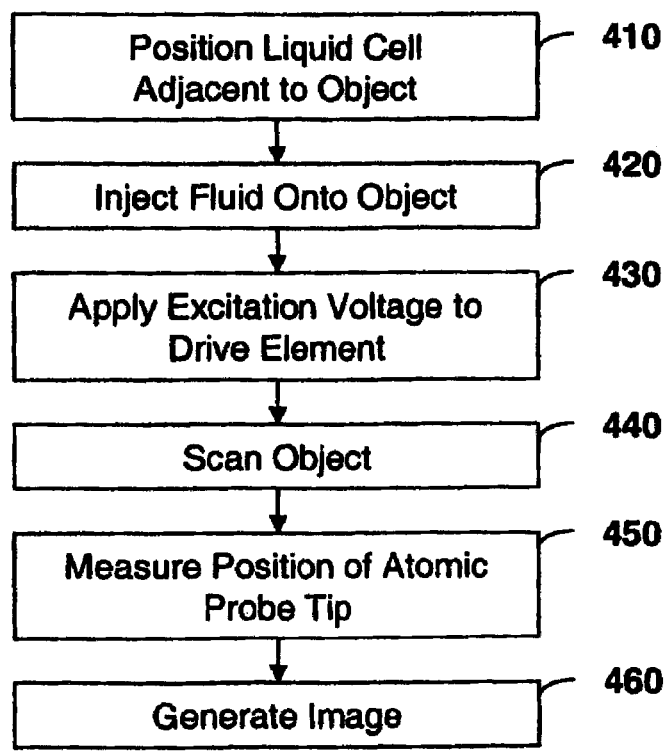
FIG. 4 is a flow diagram of a method for imaging an object in a liquid medium, in accordance with one embodiment of the current invention.

FIG. 4 shows a flow diagram of a method for imaging an object in a liquid medium, in accordance with one embodiment of the present invention at 400. Method of imaging 400 includes various steps to image an object in a liquid medium.

An object to be imaged is positioned adjacent to a liquid cell, as seen at block 410. The liquid cell includes a liquid cell housing with an internal cavity and a plurality of conductive feedthroughs connected between the internal cavity and a dry side of the liquid cell. The object may be, for example, a substrate or a surface to be imaged, an object located on a substrate or a surface, or any object that can be positioned adjacent the liquid cell and imaged. A substrate such as a glass slide or a semiconductor wafer may be placed, for example, under the liquid cell with a small gap between the bottom of the liquid cell and the substrate. The substrate may be positioned, for example, with a stage coupled to an atomic force microscope (AFM). The stage may be used, for example, to position the object to be imaged close to or in contact with an atomic probe tip coupled to the cantilevered probe.

Fluid may be injected onto the object, as seen at block 420. The fluid may be injected onto the object through an inlet port connected between the internal cavity and the dry side of the liquid cell. The fluid for imaging a biological sample may be, for example, a saline solution, a solvent, water, a conductive fluid, a non-conductive fluid, water, or a gas. The sample may be already immersed in a fluid when the object is placed adjacent to the liquid cell, and the fluid may be replenished as needed through the inlet port. Excess fluid can be removed from the interior cavity of the liquid cell from under the liquid cell or through an outlet port, though generally the fluid is adequately contained with surface tension and meniscus forces in the vicinity of the object being imaged. In some cases, only a few drops of liquid are needed to cover the object while being imaged.

An excitation voltage may be applied to a drive element disposed on the cantilevered probe, as seen at block 430. The drive element may comprise, for example, a piezoelectric drive element, a thermal drive element, or a magnetic drive element. The excitation voltage may be applied through one or more conductive feedthroughs to the drive element.

The excitation voltage may include a topographical component. The topographical component may be adjusted to maintain the cantilevered probe in a constant force mode or a constant amplitude mode when imaging in the contact mode. Feedback from a sense element on the probe or an optical sense mechanism using a beam of light may be applied to the drive element on the cantilevered probe to maintain constant force on the atomic probe tip during scanning. In the constant amplitude mode, feedback may be applied to the drive element to maintain the cantilevered probe at constant amplitude as the object or surface is being scanned. Alternatively, feedback may be applied to a piezotube coupled between the base of the cantilevered probe and the object or surface to maintain the cantilevered probe in a constant amplitude mode or a constant force mode while scanning. The topological component may be used to deflect the cantilevered probe when initially contacting the object or surface. The feedback may be applied to the piezotube in conjunction with the drive element.

The excitation voltage may be applied at a frequency near a resonant frequency of the cantilevered probe tip to tap the cantilevered probe against the object when operating in a tapping mode. A topographical component may be combined with the oscillating voltage and applied to the drive element.

The object to be imaged is scanned, as seen at block 440. The object may be scanned using, for example, a piezotube coupled to the cantilevered probe and to the liquid cell. In another example, a stage that holds the sample being imaged may be moved. Scanning may occur, for example, with repeated traces across the object with a small lateral translation at each consecutive trace.

The position of the atomic probe tip may be measured, as seen at block 450. The position of the atomic probe tip coupled to the free end of the cantilevered probe is measured when the atomic probe tip contacts the object. The cantilevered probe is coupled to the liquid cell housing and a portion of the cantilevered probe is located inside the internal cavity of the liquid cell.

In one example, the position of the atomic probe tip is measured with a piezoelectric sense element disposed on the cantilevered probe. The piezoelectric sense element may be electrically connected to external sense circuitry through one or more conductive feedthroughs in the liquid cell. The piezoelectric sense element may include a material such as zinc oxide, lead zirconate titanate, polyvinylidene fluoride, or a piezoelectric film. The piezoelectric sense element may be passivated to electrically isolate the piezoelectric sense element when, for example, a conductive fluid is placed in the internal cavity of the liquid cell. The piezoelectric sense element may be passivated with a material such as silicon nitride, silicon dioxide, parylene, Teflon, an insulating polymer, or a suitable insulating material.

In another example, the position of the atomic probe tip is measured with a piezoresistive sense element coupled to the cantilevered probe. The piezoresistive sense element may be electrically connected to external sense circuitry through one or more conductive feedthroughs in the liquid cell. The piezoresistive sense element may be passivated.

In another example, the position of the atomic probe tip is measured with a magnetic sense element coupled to the cantilevered probe. The magnetic sense element, such as one or more loops of wire, may be electrically connected to external sense circuitry through one or more conductive feedthroughs in the liquid cell. The magnetic sense element may be passivated.

In the tapping mode, an excitation voltage generally at or near a resonant frequency of the cantilevered probe is applied to the drive element to tap the atomic probe tip against the object. The position of the atomic probe tip is measured to determine the local height of the object and the x-y coordinate at the point of measurement. The x-y coordinates may be determined, for example, from the stage position or extracted from scanning voltages applied to the piezotube. The position of the atomic probe tip may be measured, for example, with a piezoelectric sense element disposed on the cantilevered probe. In another example, a piezoelectric sense element and a piezoelectric drive element comprise the same piezoelectric element on the cantilevered probe. In another example, the position of the atomic probe tip is measured with a piezoresistive sense element coupled to the cantilevered probe. The piezoresistive sense element provides a change in resistance related to the bending of the cantilevered probe. In another example, the position of the atomic probe tip is measured with a beam of light striking a photodetector after being reflected from at least a portion of the cantilevered probe. Measurements of the atomic probe tip position may be combined with the position of the piezotube to generate an image.

An image of the object is generated, as seen at block 460. The image is generated from the measured positions of the atomic probe tip when the atomic probe tip is scanned across the object. The images may be stored electronically, and may be scaled, enhanced, colored, cropped, stitched or otherwise modified as desired.

Figure 5:
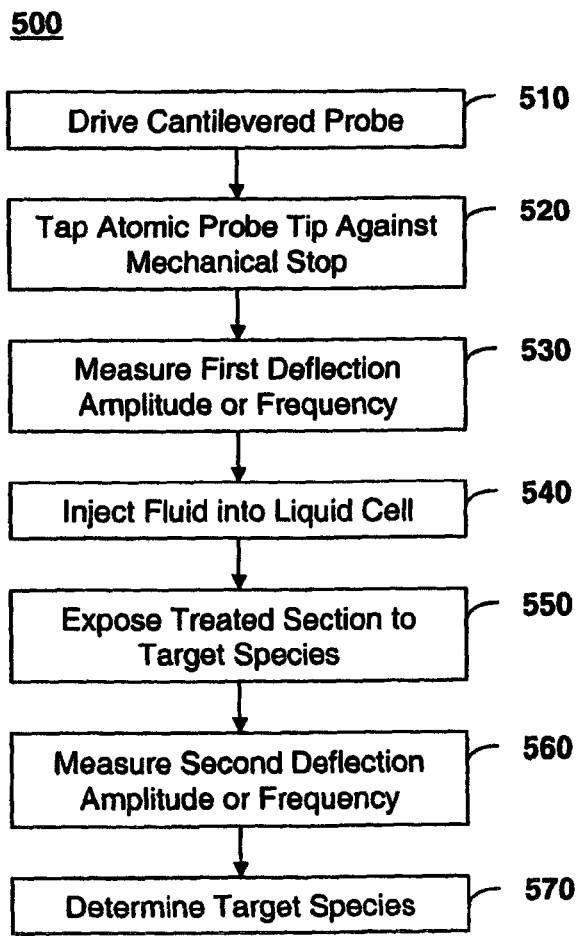
FIG. 5 is a flow diagram of a method for sensing a target species with a liquid cell, in accordance with one embodiment of the current invention.

FIG. 5 shows a flow diagram of a method for sensing a target species with a liquid cell, in accordance with one embodiment of the present invention at 500. Target species sensing method 500 includes various steps to detect and determine a target biological or chemical species by using a cantilevered probe.

The cantilevered probe is driven, as seen at block 510. The cantilevered probe is coupled to an internal cavity of the liquid cell. The liquid cell may initially have fluid contained in at least a portion of the liquid cell. An excitation voltage is applied to a drive element such as a piezoelectric drive element disposed on the cantilevered probe. The drive element may comprise a material such as, for example, zinc oxide, lead zirconate titanate, polyvinylidene fluoride, or a piezoelectric film. The drive element may be passivated to electrically isolate the drive element when a conductive fluid is placed in the internal cavity of the liquid cell. The drive element may be passivated with a material such as silicon nitride, silicon dioxide, parylene, Teflon, an insulating polymer, or an insulating material. The excitation voltage is applied to the drive element through one or more conductive feedthroughs that are connected between the internal cavity and a dry side of the liquid cell. The cantilevered probe may be driven at a frequency at or near a resonant frequency of the cantilevered probe. The cantilevered probe may be driven into oscillation at its fundamental resonant frequency, for example, or at a higher resonant frequency corresponding to a higher order resonant mode. The cantilevered probe may be driven, for example, at or near a resonant frequency or at an off-resonance frequency. The amplitude of oscillation may be controlled, for example, by controlling the amplitude of the drive signal applied to the drive element.

In a tapping mode that uses a mechanical stop, the atomic probe tip coupled to a free end of the cantilevered probe is tapped against a reference surface or mechanical stop, as seen at block 520. The mechanical stop is coupled to a base end of the cantilevered probe. The atomic probe tip is tapped against the mechanical stop in the tapping mode to provide a reference tapping amplitude that shifts, for example, when a target chemical or biological species is applied to a treated section of the cantilevered probe. The cantilevered probe or the mechanical stop may be positioned such that the free end of the cantilevered probe lightly strikes the mechanical stop, or such that an atomic probe tip attached near the free end of the cantilevered probe lightly strikes the mechanical stop. The tapping amplitude can be adjusted, for example, by adjusting the drive voltage to the drive element, or by positioning the mechanical stop with a positioning element coupled between the mechanical stop and the liquid cell.

The mechanical stop typically comprises a smooth, relatively hard surface for the cantilevered probe to tap. For example, a portion of a polished silicon wafer, a smooth glass plate, a mica surface, a smooth alumina surface, or a ground and polished metal plate may form the contact surface of the mechanical stop. The mechanical stop may include a positioning element coupled between the mechanical stop and the base end of the cantilevered probe.

The positioning element provides the ability to position the mechanical stop at a suitable location for striking by the cantilevered probe. Translational movements in one or more directions may be provided with translation actuators such as screw drives, linear actuators, or piezoelectric actuators. The mechanical stop may be coarsely adjusted by the positioning element to engage the cantilevered probe in a tapping mode. The mechanical stop may be positioned with fine adjustments of the positioning element, which are used to maintain an oscillation of the cantilevered probe at a nominally constant amplitude. The positioning element may comprise, for example, a piezotube or other suitable positioning mechanism for providing fine positioning of the mechanical stop with respect to the cantilevered probe. Alternatively, the positioning element may be coupled directly to the base end of the cantilevered probe. The mechanical stop and at least a portion of the positioning element may be enclosed by or may be in close proximity to the liquid cell.

The cantilevered probe is driven into oscillation with a drive element, and the oscillating cantilevered probe is tapped against the mechanical stop or reference surface. Amplitudes of oscillation are measured, and changes in the oscillation amplitude are measured after exposing the cantilevered probe to a target biological or chemical species. The target species is determined based on oscillation amplitudes of the cantilevered probe that are measured by the sense element when a treated section of the cantilevered probe is exposed to the target chemical or biological species.

A first amplitude or frequency is measured with a sense element that is coupled to the cantilevered probe, as seen at block 530. The sense element may comprise, for example, an optical sense element, a piezoelectric sense element, a piezoresistive sense element, a capacitive sense element, or a magnetic sense element. The sense element may comprise, for example, a piezoresistive sense element coupled to the cantilevered probe. The deflection amplitude or frequency may be measured, for example, by directing a beam of light from a light source onto a surface near the free end of the oscillating cantilevered probe and detecting the beam of light when the beam of light is reflected from at least a portion of the oscillating cantilevered probe, such as with a photodetector or a photodetector array.

The sense element may comprise, for example, a piezoelectric sense element disposed on the cantilevered probe. The deflection amplitude or frequency of the oscillating cantilevered probe is measured by driving the cantilevered probe into oscillation with a piezoelectric drive-sense element mounted on the cantilevered probe, and measuring a signal from the piezoelectric drive-sense element when the cantilevered probe is oscillating. In another example, the cantilevered probe may be brought into intermittent contact with the reference surface. The root-means-square (rms) amplitude of the AC voltage generated by the piezoelectric sense element is proportional to the oscillation or deflection amplitude of the cantilever. When the cantilevered probe is contacting the surface intermittently, the oscillation amplitude can be compared to a set-point amplitude and maintained at a specified value by a feedback loop through the drive circuit. Exposing the cantilevered probe to a target chemical or biological species causes the cantilevered probe to bend up and away from the reference surface on which it taps. The feedback loop responds by moving the surface vertically with a piezotube or other positioning element until the specified cantilevered amplitude is restored. The piezotube response may be monitored with data-acquisition hardware and software.

The cantilevered probe may be straight initially or have some minor curvature due to processing or due to effects of the treated section on a surface of the cantilevered probe. When the treated section is exposed, for example, to a chemical or biological species that reacts with it, the treated section may expand or contract, causing bending of cantilevered probe and a change in the neutral position. For example, the treated section located near a base end of the cantilevered probe may enlarge when exposed to a target species, and cause a slight curvature of the cantilevered probe, which results in a deflection shift at the free end of the probe. Slowly changing or quasi-static displacements of the cantilevered probe occur when deflections of the cantilevered probe change slowly with exposure to a chemical or biological species or with slow changes in the concentration of the chemical species in the measurement medium. Changes are considered slow when the time frame for the change is longer than the period of vibration of the oscillating cantilevered probe.

Static displacements may be measured optically or with strain-sensitive piezoelectric or piezoresistive elements positioned on the cantilevered probe. Static displacements can be measured electrostatically or magnetically. Generally, static displacements are difficult to measure with piezoelectric sense elements because of the gradual decrease or bleed-off of charge generated when the piezoelectric material is strained. However, dynamic displacements are readily measured with piezoelectric films, particularly when the frequency of vibration is appreciably faster than the decay rate of generated charge. An oscillating or vibrating cantilevered probe creates a charge that can be detected, for example, with a charge amplifier, a transimpedance amplifier, or an AC bridge circuit that generates an output voltage, which provides a measure of the deflection amplitude. The output voltage can also be used to measure a frequency of one or more resonant modes of the cantilevered probe when the cantilevered probe is oscillated. Static or quasi-static displacements of the neutral position of the cantilevered probe that are due to chemical or biological exposure, however, are difficult to measure with a piezoelectric sense element even with dynamic oscillations unless there is a reference surface.

A reference surface may be provided by a mechanical stop. The mechanical stop is initially positioned such that the free end of the cantilevered probe or a probe tip coupled to the free end of the cantilevered probe strikes the stop when the probe is oscillating. The mechanical stop may be positioned, for example, such that the cantilevered probe lightly or heavily taps the mechanical stop.

A fluid may be injected into the interior cavity of the liquid cell through an inlet port connected between the internal cavity and the dry side of the liquid cell, as seen at block 540. The fluid may be added to or replace other fluid in the interior cavity of the liquid cell. The fluid may include the target species. The fluid may comprise a liquid or a gas, and may be forcibly or diffusively injected into the interior cavity. An outlet port may be used to vent, evacuate, or recirculate the fluid in the interior cavity.

A treated section of the cantilevered probe is exposed to a target species, as seen at block 550. The cantilevered probe may gain or lose mass, for example, when the treated section of the cantilevered probe is exposed to the target species. Alternatively, the treated section when exposed to the target species may cause an upward or downward bending of the cantilevered probe that may be detected by various types of measurements. The measurements include the static or quasi-static deflection of the cantilevered probe, the amplitude of a probe tip tapping against a reference surface or mechanical stop, the voltage applied to a piezotube supporting the cantilevered probe or coupled to the mechanical stop, the drive voltage required to keep the cantilevered probe in minimal contact with the mechanical stop, and other suitable measurements techniques for determining the quasi-static bending of the cantilevered probe.

The target species may include, for example, mercury, hydrogen, an alcohol, water vapor, a chemical element, a chemical compound, an organic material, an inorganic material, a biological material, a DNA strand, a bioactive agent, or a toxin. The treated section of the cantilevered probe may comprise, for example, a patterned gold layer, a palladium layer, an alcohol-absorbent polymer, a water-absorbent material, a chemical-sensitive layer, a biosensitive material, or a thiol. The treated section of the cantilevered probe may be, for example, on the topside or underside of the cantilevered probe. When the treated section of the cantilevered probe is exposed to the chemical or biological species, the treated section may react or respond by increasing or lessening the stiffness of the cantilevered probe, which changes the resonant frequency of the cantilevered probe. The resonant frequency can also be changed when the exposure of the treated section to a chemical or biological species causes the treated section to add mass to or subtract mass from the cantilevered probe. The treated section when exposed to the chemical or biological species could also cause the cantilevered probe to bend or curve quasi-statically from its initial neutral position, or some combination thereof.

A second deflection or frequency of the cantilevered probe is measured, as seen at block 560. The second deflection amplitude or frequency is generally determined with the same sense element as used for the first deflection or frequency measurement.

The deflection amplitude or frequency of the oscillating cantilevered probe may be impacted by the interaction between the chemical or biological species and the treated section of the cantilevered probe. The fundamental resonant frequency of the oscillating cantilevered probe may be measured, or a suitable overtone such as the second or third mode may be measured. Oscillation frequencies may be determined from amplitude measurements taken as a function of time. Phase information may also be extracted from the amplitude information by comparing the amplitude information to reference signals from, for example, the drive signal.

The target species is determined based on the first deflection amplitude or frequency measurement and the second deflection amplitude or frequency measurement, as seen at block 570. The presentation and concentration of the target species may be determined, for example, by measuring the amount of frequency shift of the cantilevered probe. The presentation and concentration of the target species may be determined, for example, by determining the magnitude of the static or quasi-static bending of the cantilevered probe. In one example, the chemical or biological species may be determined to be absent or present. In another example, the concentration of the species may be determined. In another example, a particular type of chemical or biological species may be detected and quantified according to the specificity of the treated section. The target chemical or biological species may be determined, for example, based on the first deflection amplitude and the second deflection amplitude when operating in an open-loop mode. In another example, the chemical or biological species may be determined based on the position of the mechanical stop when operating in a closed-loop mode. In another example, the chemical or biological species may be determined based on the measured frequency of the oscillating cantilevered probe, such as the fundamental frequency or an overtone.

The chemical or biological species may be determined continuously, for example, when the treated section responds continuously to the composition and the concentration of the exposed target species. In another example, the concentration of the target species may be determined at its peak value when the treated section of the cantilevered probe does not respond reversibly after the target species is applied and then withdrawn. In this case, a new probe may be required or the old one may need to be cleaned.

Temperature variations within the enclosure may result in static beam-bending of the cantilevered probe, particularly when two dissimilar materials with differing thermal expansion coefficients are used to form the cantilevered probe. Compensation of beam-bending due to temperature may be accomplished by combining, for example, measurements from a separate, non-exposed cantilevered probe, an untreated cantilevered probe, or a temperature measuring device such as a resistive temperature device (RTD), thermocouple, or diode-based temperature sensor mounted on or in the liquid cell.

The cantilevered probe may be heated to initialize or re-initialize the treated section of the cantilevered probe, so that a new reading or an accurate first reading may be made. The cantilevered probe may be re-initialized, for example, by reversing any chemical reactions that have occurred at the treated section. The cantilevered probe may be coupled to and heated by a resistive heater coupled to the cantilevered probe. Alternatively, an external heater such as a heat lamp or a hot gas system may be used to heat and re-initialize the cantilevered probe. Chemical re-initialization may be accomplished, for example, by using cleaning processes such as wiping or solvent exposure, or by reversing any chemical reactions that occurred to the treated section. The cantilevered probe may be cleaned, for example, with successive dips in acetone, ethanol, or with an oxygen plasma.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. A chemical sensor system comprising:
   a first cantilevered probe comprising:
     a piezoelectric layer;
     a treated section selected to react with a chemical species;
     a resistive heater thermally couplable to the treated section; and
     first and second electrodes electrically coupled to the piezoelectric layer;
   a driver circuit electrically coupled to the first and second electrodes and configured to actuate the cantilevered probe;
   a sensing circuit electrically coupled to the first and second electrodes and configured to sense oscillation of the cantilevered probe;
   a heater circuit electrically coupled to the resistive heater; and
   a plurality of additional cantilevered probes arranged in an array together with the first cantilevered probe, each of the plurality of additional cantilevered probes comprising:
     a piezoelectric layer; and
     first and second electrodes electrically coupled to the piezoelectric layer;
   wherein the first cantilevered probe is actuated when, through the first and second electrodes, a drive voltage is applied to the piezoelectric layer by the driver circuit, the actuated cantilevered probe generating a displacement signal transmitted to the sensing circuit, and wherein the piezoelectric layers of each of the cantilevered probes of the array are connected in parallel.

2. The sensor system of claim 1, wherein each of the plurality of additional cantilevered probes comprises a resistive heater; and
   an electrical lead electrically coupled to the heater circuit and each of the resistive heaters of the plurality of additional cantilevered probes.

3. The sensor system of claim 1, wherein the resistive heater is formed as one piece with the cantilevered probe.

4. The sensor system of claim 1, further comprising a passivation layer disposed on the piezoelectric layer of the first cantilevered probe.

5. The sensor system of claim 1, wherein at least two of the array of cantilevered probes having a treated section different from one another.

6. The sensor system of claim 1, wherein at least one of the array of cantilevered probes having a treated section and at least one of the array of cantilevered probes not having a treated section.

7. A method of determining the composition of a sample comprising:
   providing a first cantilevered probe and a plurality of additional cantilevered probes arranged in an array together with the first cantilevered probe,
   the first cantilevered probe comprising:
     a piezoelectric layer;
     a resistive heater;
     a treated section;
     a first electrode electrically coupled to the piezoelectric layer; and
     a second electrode electrically coupled to the piezoelectric layer; and
   each of the plurality of additional cantilevered probes comprising:
     a piezoelectric layer; and
     first and second electrodes electrically coupled to the piezoelectric layer;
   wherein the piezoelectric layers of each of the cantilevered probes of the array are connected in parallel;
   driving the first cantilevered probe by applying an excitation voltage to the piezoelectric layer;
   exposing the treated section to a sample; and
   sensing vibration of the first cantilevered probe by measuring a signal generated by the piezoelectric layer.

8. The method of claim 7 wherein exposing the treated section to a sample comprises exposing the treated section to a liquid sample.

9. The method of claim 7 further comprising heating at least one of the array of cantilevered probes to initiate a probe or cause a chemical reaction of the sample.

10. A chemical sensor system comprising:
    a first cantilevered probe comprising:

a piezoelectric layer;

a resistive heater thermally couplable to the surface of the first cantilevered probe; and first and second electrodes electrically coupled to the piezoelectric layer;

a driver circuit electrically coupled to the first and second electrodes and configured to actuate the cantilevered probe;

a sensing circuit electrically coupled to the first and second electrodes and configured to sense oscillation of the cantilevered probe;

a heater circuit electrically coupled to the resistive heater; and a plurality of additional cantilevered probes arranged in an array together with the first cantilevered probe, each of the plurality of additional cantilevered probes comprising:

a piezoelectric layer; and first and second electrodes electrically coupled to the piezoelectric layer;

wherein the first cantilevered probe is actuated when, through the first and second electrodes, a drive voltage is applied to the piezoelectric layer by the driver circuit, the actuated cantilevered probe generating a displacement signal transmitted to the sensing circuit, and wherein the piezoelectric layers of each of the cantilevered probes of the array are connected in parallel.

11. The sensor system of claim 10, wherein each of the plurality of additional cantilevered probes comprises a resistive heater; and an electrical lead electrically coupled to the heater circuit and each of the resistive heaters of the plurality of additional cantilevered probes.

12. The sensor system of claim 10, further comprising a passivation layer disposed on the piezoelectric layer of the first cantilevered probe.

13. The sensor system of claim 10, wherein at least one of the array of cantilevered probes having a treated section and at least one of the array of cantilevered probes not having a treated section.

14. The sensor system of claim 10, wherein the first cantilevered probe further comprises a treated section selected to react with a chemical species.

* * * * *